June 7, 1932. O. SESSION 1,862,038
ANIMAL TRAP
Filed Oct. 14, 1931
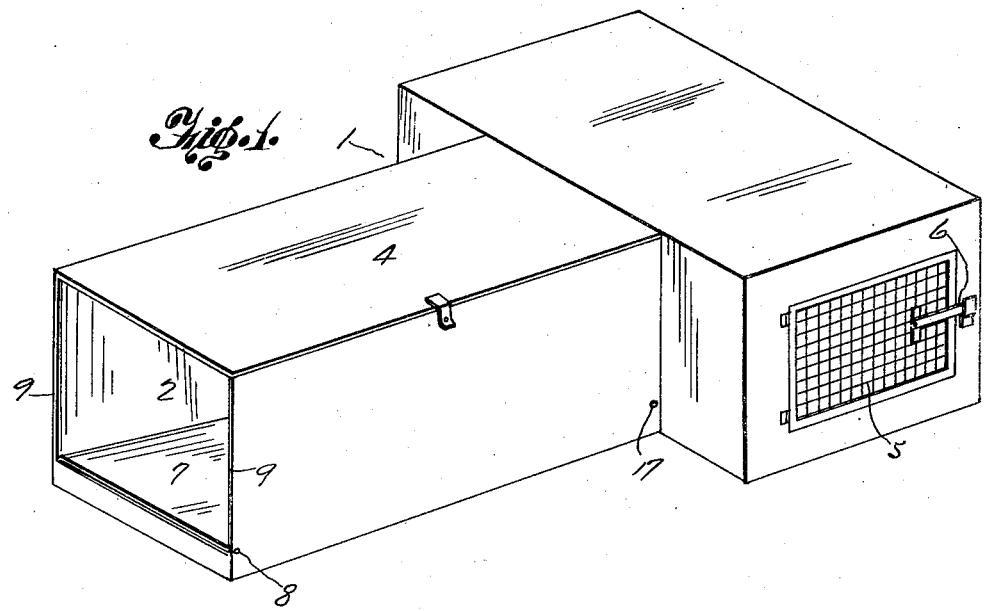
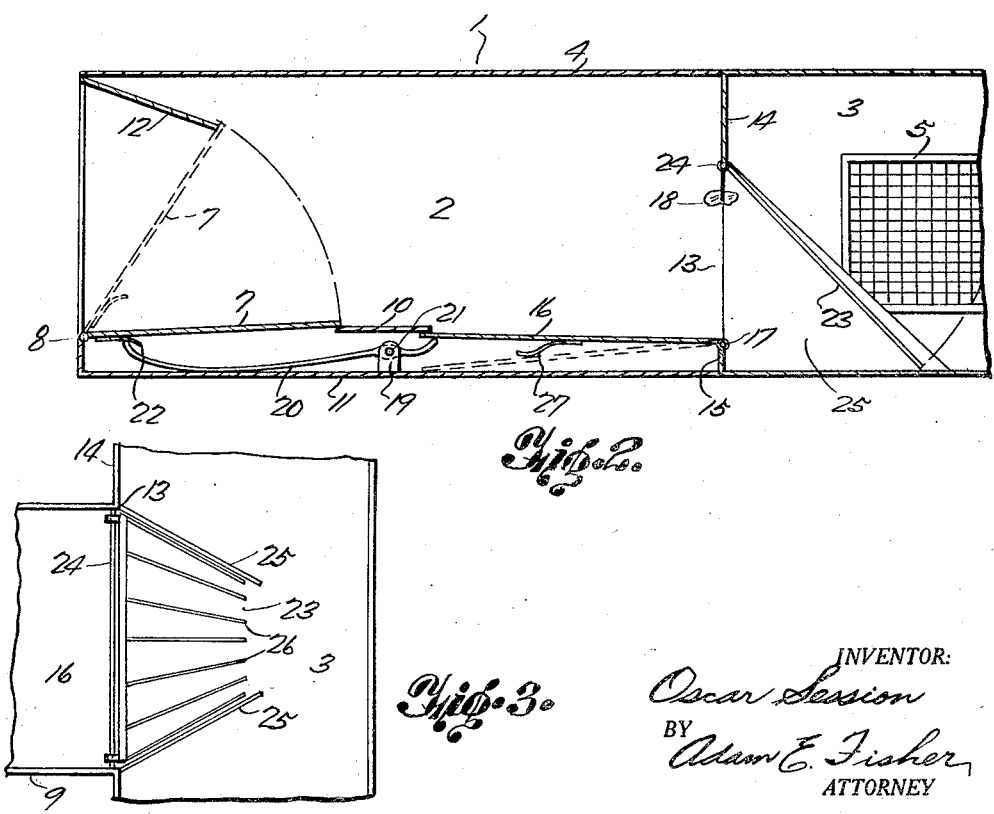
INVENTOR:
Oscar Session
BY Adam E. Fisher
ATTORNEY Patented June 7, 1932

1,862,038

UNITED STATES PATENT OFFICE

OSCAR SESSION, OF TOPPENISH, WASHINGTON

ANIMAL TRAP

Application filed October 14, 1931. Serial No. 568,654.

This invention relates to animal traps.

The main object of the invention is to provide a simple, efficient and inexpensive animal trap which will catch a number of animals with one initial setting, the trap setting itself after each animal is caught.

Another object is to provide a trap of this kind comprising an entrance chamber, a trap chamber, doors at the entrance to each chamber, and a means for automatically and temporarily closing the door to the entrance chamber as the animal attempts to reach the bait.

With these and other objects in view the invention resides in the novel construction and arrangement of parts as hereinafter set forth and claimed, reference being had to the accompanying drawing wherein:

Figure 1 is a perspective view of the trap.

Figure 2 is a longitudinal vertical section, a part being broken away.

Figure 3 is a horizontal section through a medial portion of the trap showing the door in the trap chamber entrance.

Referring now more particularly to the drawing the trap comprises a housing designated generally at 1 of the shape shown providing an entrance chamber 2 and trap chamber 3 both rectangular in form and arranged with their longitudinal axes at right angles, that is, the entrance chamber 2 enters at its inner end into a medial portion of one side of the trap chamber 3. The housing 1 over the entrance chamber 2 has a hinged door 4 to allow access thereto and for similar purposes each end of the trap chamber 3 has hinged doors 5 of screen or reticulated material provided with latches 6. The outer end of the entrance chamber 2 is open as shown and adjacent the lower margin thereof an entrance door 7 is hinged by its lower end on a hinge rod 8 extended laterally through the sides 9 of the housing. This entrance door 7 is adapted normally of its own weight to swing inward and rest at its free edge on a rest 10 extended laterally between the sides 9 and arranged at some distance above the bottom 11 of the housing as shown. When closed in a manner to be hereinafter set forth the door 7 is swung upward where it comes in contact with a hood or apron 12 extended angularly inward and downward from the housing adjacent its open end, and the door 7 is thus held in such position that it will fall back to its open position when the force holding it closed is removed.

At the junction of the entrance and trap chambers 2 and 3 an opening 13 is provided in the side 14 of the latter chamber 3, the said opening extending from side to side of the chamber 2 but being located some distance above the bottom 11 of the housing so as to leave a vertical support 15 extended upward from said bottom. A trip pan 16 is hinged by its rear edge at 17 to the upper margin of this support 15 and extends forwardly therefrom to terminate at its forward edge a short distance beneath the rear edge of the rest 10. A pivot ear 19 is secured to the housing bottom 11 beneath the rest 10 and an operating or trip lever 20 is pivoted intermediate its ends thereto at the point 21. The rear end of this lever 20 is bent arcuately upward and engages the underside of the trip pan 16 near the free or forward edge thereof and the forward end of said lever is bent arcuately downward and upward and bears at its extreme end on a leaf spring 22 secured to the under or inner side of the entrance door 7 adjacent the hinge rod 8. A door 23 is hinged by its upper end on a hinge rod 24 extended across the top of the opening 13 and said door extends angularly inward and downward therefrom into the trap chamber 3 between side plates 25. The said door 23 is formed of spaced wires or bars 26 so as to permit the animals a view into the chamber 3.

In operation the animal enters the entrance chamber 2 and in attempting to reach the bait 18 depended from the upper edge of the opening 13 or from the top of the trap forwardly of the opening, stands upon the trip pan 16. The weight of the animal on this pan overbalances the same and swings it downward as shown in the dotted lines in Figure 2 and rocks the trip lever 20 on its pivot 21. The forward end of this lever 20 thus moves upward swinging the entrance door 7 shut as shown in the dotted lines also in Figure 2. The animal then seeing his means of escape cut off naturally attempts to enter the trap chamber 3 and does so by swinging the door 23 upward. This door then falls shut behind the animal and the animal's weight being removed from the trip pan 16 the entrance door 7 overbalances the lever and pan and returns to its open and set position. The animal is thus caught and the trap reset for the next victim. The arrangement is of course such that the door just overcomes the weight of the pan 16 and the lever 20 is so proportioned as to swing the door 7 fully shut. To add resiliency and to prevent jarring both the door 7 and the trip pan 16 have leaf springs on their undersides, the one on the latter being indicated at 27 and the operation of these springs will be apparent.

From the foregoing it will be understood that I have provided a simple and inexpensive trap and one which will be very convenient and efficient in use.

While I have herein set forth a certain preferred embodiment of my invention it is understood that I may vary from the same in minor structural details so as best to construct a practical device for the purposes intended, not departing from the spirit of the invention and within the scope of the appended claims.

I claim:

1. In a device of the kind described, a housing having an entrance chamber and trap chamber and entrance openings into the said chambers, an entrance door hinged adjacent the lower edge of the opening into the entrance chamber, a trip pan hinged adjacent the entrance into the trap chamber, a bearing ear mounted between the said entrance door and trip pan, a trip lever pivoted intermediate its ends to the said bearing ear and engaging the said entrance door and trip pan at its ends, and a door hinged in the said opening into the trap chamber and extended angularly and downwardly into the said chamber.

2. In a device of the kind described, a housing having an entrance chamber and a trap chamber and entrance openings into the said chambers, a rest mounted in the entrance chamber midway between the said openings, an entrance door hinged by one margin to the lower edge of the opening into the entrance chamber and adapted to normally swing inward and lie upon the said rest, a trip pan hinged by one edge adjacent the said opening into the trap chamber and extended at its free edge beneath the said rest, a pivot ear mounted beneath the rest, a trip lever pivoted intermediate its ends to the said pivot ear and engaging the entrance door and trip pan at its ends and a door hinged horizontally in the opening into the trap chamber and extending angularly inward and downward into the said chamber.

In testimony whereof I affix my signature.

OSCAR SESSION.